V. TOMMASINI.
APPARATUS FOR THE MANUFACTURE OF STUFFED ALIMENTARY PASTES.
APPLICATION FILED DEC. 29, 1913.
1,236,998.
Patented Aug. 14, 1917.
3 SHEETS—SHEET 1.
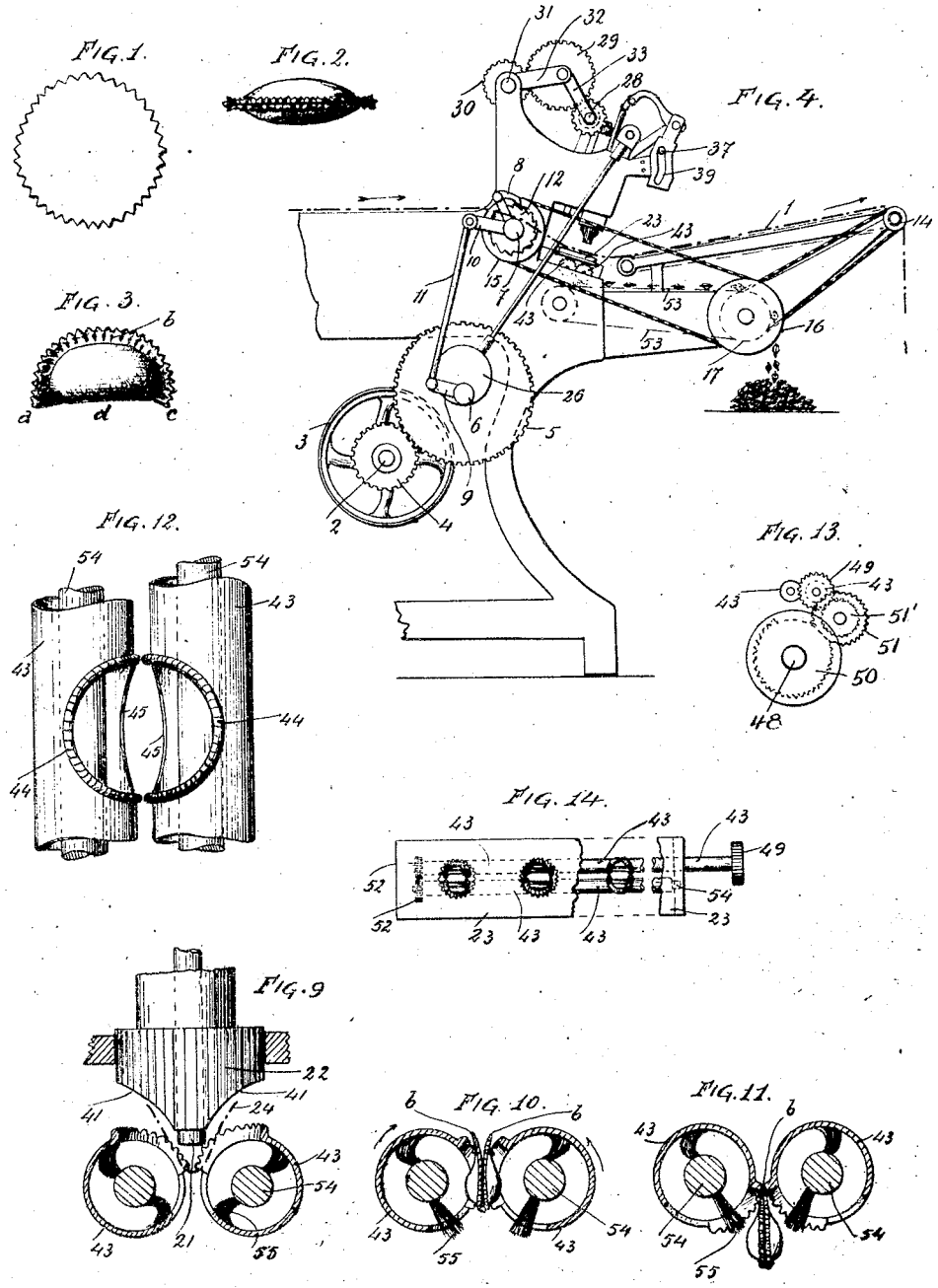

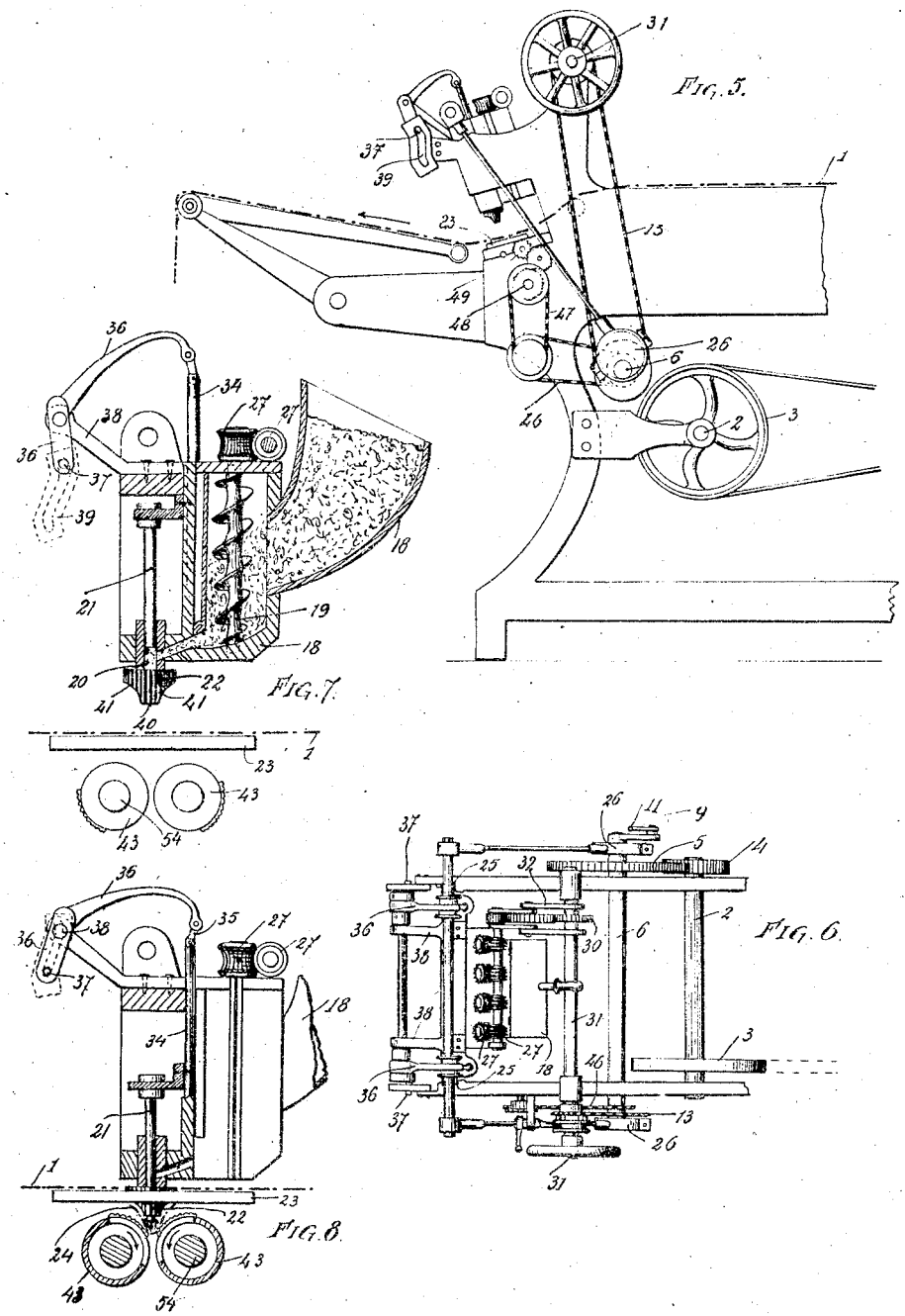

V. TOMMASINI.
APPARATUS FOR THE MANUFACTURE OF STUFFED ALIMENTARY PASTES.
APPLICATION FILED DEC. 29, 1913.

1,236,998.

Patented Aug. 14, 1917.
3 SHEETS—SHEET 3.

Witnesses.
M. J. Whittaker

Inventor:
Vitaliano Tommasini
per H. W. Waghorn
Attorney.

UNITED STATES PATENT OFFICE.

VITALIANO TOMMASINI, OF MILAN, ITALY.

APPARATUS FOR THE MANUFACTURE OF STUFFED ALIMENTARY PASTES.

1,236,998.

Specification of Letters Patent. Patented Aug. 14, 1917.

Application filed December 29, 1913. Serial No. 809,387.

*To all whom it may concern:*

Be it known that I, VITALIANO TOMMASINI, a subject of the King of Italy, residing at 42-44 Via Ponte Seveso, Milan, in the Kingdom of Italy, have invented certain new and useful Improvements in Apparatus for the Manufacture of Stuffed Alimentary Pastes, of which the following is a specification.

The invention has for its object a machine for the manufacture of stuffed alimentary pastes and more particularly, ravioli, cornets and so forth.

A machine constructed in accordance with the present invention is illustrated by way of example, in the accompanying drawing in which:—

Figure 1 shows a piece of paste from which a ravioli is made.

Fig. 2 is an elevation and Fig. 3 a plan of the finished product.

Figs. 4 and 5 are elevations of opposite sides of the machine.

Fig. 6 is a plan.

Figs. 7 and 8 show two different positions of the device by which the stuffing is fed to the sheet of paste.

Figs. 9, 10, 11 and 12 are detail views of the cutting, folding and indenting mechanism.

Figs. 13, 14 and 15 are details hereinafter more particularly referred to.

Figure 15:
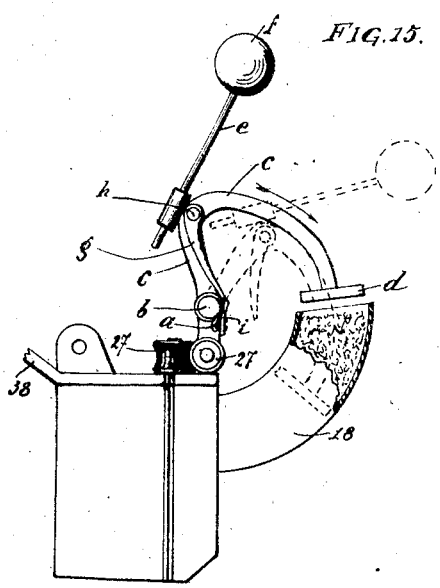

The machine comprises:

1. A feeding device for the sheet of paste.
2. A device for feeding the stuffing material onto the sheet of paste.
3. A device which cuts and forms the peripheral indentations upon the piece of paste (Fig. 1) which is afterward folded back upon itself to form the ravioli.
4. A device which folds back the said piece of paste (Fig. 1) in such a manner as to inclose the stuffing material this device pressing the edges in such manner as to produce the final product represented in Figs. 2 and 3.

The device for effecting the operation of feeding the paste presents no appreciable difference as compared with other devices employed in other machines for the manufacture of alimentary pastes.

Referring to the drawings, the sheet of paste 1 (Figs. 4 and 5) receives an intermittent feed movement, the intervals of stoppage being suitably coördinated to the movements of the cutting apparatus.

The feeding movement is effected by means of the shaft 2 which carries the driving pulley 3, and a pair of gear wheels 4 and 5 to the shaft 6, which latter controls the shaft 7 carrying the pawl 8, by means of cranks 9 and 10 and a connecting rod 11. Through the intermediary of the toothed wheel 12 the pawl 8 produces the advance of the sheet of paste 1 step by step by means of the roller 14 which is itself operated by the ratchet wheel 12 driven by the pulleys 15, 16 and 17 which are connected together by a chain transmission. It will be understood that in operation the roller 14 is actuated by means of chains which receive an intermittent motion from the pulley 15, integral with the ratchet wheel 12 which thus accomplishes step-by-step an angular displacement corresponding to the advance of a tooth due to the combined action of rod 11 and pawl 8. The stuffing contained in the hopper receptacle 18 (Fig. 7) is displaced by the screw 19 which is given a movement of continuous rotation, toward the channel 20. The small piston 21 is displaced in the channel 20 so as to cause the stuffing to advance. After passing through the member 22 intended for cutting and indenting, and the perforated table 23 (Fig. 4) fixed to the frame, the stuffing becomes deposited upon the severed piece of paste 24 (Figs. 8 and 9). A cam 26 mounted upon the shaft 6 (Fig. 5) is adapted to impart a vertical reciprocating movement to the hopper and the parts connected therewith during which movement the hopper is guided in the grooves 25 (Fig. 6) in the frame of the machine. This vertical movement is rendered necessary owing to the connection of the hopper with the member serving to cut and indent the paste. The screw 19 is rotated through worm gearing 27, 27, driven in turn by three gear wheels 28, 29, 30. The latter are mounted upon a shaft 31 driven by a shaft 6 by means of a chain 13. As the gear wheels 28, 29, 30 must follow the changes in position of the worm gearing 27, 27, wheel 30 is mounted upon arms 32, 33. To enable the small piston 21 to expel the stuffing from the hopper casing 18, it receives a more rapid movement of descent than that of the hopper 18, the desired expulsion resulting from the speed of the member 21 relatively to the member 18. This relative movement is obtained by pivoting the plate 34, fixed to the small piston 21, through the intermediary of the small connecting rod 35, to the lever 36 pivoted at 38 upon an arm fixed to the hopper casing 18. The knob 37 at the extremity of the lever 36 while participating in the reciprocating movement of the hopper, traverses the slot 39 and transmits to the lever 36, 36 an oscillating movement, the profile of the slot 39 being such that this oscillation gives rise to a movement of the piston 21 relatively to the hopper casing 18 during the downward movement of the latter.

When the stuffing is moist and has a tendency to stick to the walls of the hopper receptacle 18 an auxiliary device shown at Fig. 15 of the drawings is resorted to in order to secure a perfectly regular feeding. The hopper receptacle 18 is in this case of circular shape, the center $b$ of the circle being struck from the end of a small post $a$ projecting upward from the receptacle; $b$ is the center of a pivot around which the bell crank shaped lever $c$ can freely rotate.

The lever $c$ is provided at its outer end with a piston $d$ corresponding in shape to the cross section of the hopper receptacle 18. To the lever $c$ is secured a rod $e$ carrying at its outer end a counterweight. A pawl $g$ pivoted at $h$ on said lever $c$ engages an abutment $i$ of the post $a$ and keeps the lever in the position shown in full lines in the figure. When it is desired to cause the piston $d$ to enter the hopper receptacle 18 in order to push the stuffing down, the attendant releases the pawl $g$ when the counterweight will cause the whole device to take the position shown in dotted lines and the piston $d$ to follow the descending motion of the stuffing.

As shown in Fig. 6 a plurality of propeller screws are alined along the width of the casing with their respective worm driving gears 27, 27 (four being shown in the drawing). It will of course be understood that each of the propeller screws acts in conjunction with one of the small pistons 21, a severing member 22 and a perforation in the corresponding fixed plate 23. The severing member 22 is hollow so that it can be traversed by the small piston 21, provided with a lower flange 40, having an arched cutting periphery 41 which is preferably indented as shown diagrammatically in Figs. 7 and 9, so as to sever and form the indented periphery on the circular piece of paste (Fig. 1) and thereafter turn it back as shown in Figs. 8 and 9.

The piece of paste 24 to which the piston 21 has supplied the stuffing and which the severing and indenting member has commenced to turn over, is seized by the cylinders 43, 43 which close it completely by uniting the edges as indicated in Figs. 10 and 11. The cylinders 43 are provided with apertures (Fig. 12) indented upon a portion of their periphery at 44, the remaining portion 45 being smooth. The indented edges of the apertures come into contact with the periphery $a-b-c$ and the unindented portion with the periphery $a-d-c$ of the ravioli for the purpose of closing the latter, this closing being effected by the compression of the edges of the piece of paste. It is necessary that the cylinders 43, 43 should not commence to carry the ravioli with them before the latter has received the stuffing and it is also necessary that the stuffing should be fed to the ravioli while it is still stationary. To this end the two cylinders 43 are driven from the shaft 6 through the chain transmissions 46 and 47 to the shaft 48 (Fig. 13) from which the movement is transmitted to the pinion 49 mounted upon one of the cylinders 43 through the intermediary of two wheels 50 51 (Fig. 13) which are partially toothed, and a wheel 51'.

The plain and toothed portions of the wheels 50, 51 are of such dimensions that when the feed of the sheet of paste ceases, the cylinders 43 for effecting the folding and closing operations also stop, inasmuch as when, during its rotation, the last tooth of the toothed portion of wheel 50 leaves the last tooth of the toothed portion of wheel 51 and the plain portions of the wheels 50, 51 are adjacent to one another, the wheels 51, 51' will cease rotating, until the first advancing tooth of the rotating wheel 50 meshes again with the toothed portion of wheel 51. During this interval the cutting of the piece of paste and the deposit of the stuffing thereon takes place.

The cylinder 43 operated by the pinion 49 transmits movement to the other cylinder by means of a pair of pinions 52, 52 (Fig. 14). The rotating cylinders 43, 43 are hollow and internally they are traversed by fixed rods 54 (Fig. 12) carrying brushes 55 (Figs. 9 and 10) which serve to clean the interior of the cylinder by expelling therefrom any stuffing that may have penetrated the aperture 44, 45. The ravioli, when finished, fall from between the cylinders 43 onto the endless apron 53 (Fig. 4) which discharges them from the machine.

What I claim as my invention and desire to secure by Letters Patent of the United States is:—

1. Apparatus for manufacturing stuffed alimentary pastes, feeding means for a sheet of paste, means for cutting said paste, means for feeding stuffing material onto a cut piece of paste, and means for folding the cut piece of paste back on itself to inclose the stuffing and simultaneously pressing and securing the free edges together.

2. Apparatus for manufacturing stuffed alimentary pastes comprising in combination feeding means for a sheet of paste, cutting means for severing portions of said paste, means for depositing a quantity of stuffing material on the severed portions of paste and means for folding the cut piece of paste back on itself to inclose the stuffing and simultaneously pressing and securing the free edges together.

3. Apparatus for manufacturing stuffed alimentary pastes comprising in combination, feeding means for a sheet of paste, a hopper for containing stuffing material, means for imparting motion to the hopper, feeding means for the stuffing material, means for cutting and indenting sections of the paste, said means being integral with the hopper and moving therewith and means for folding the cut piece of paste back on itself to inclose the stuffing and simultaneously pressing and securing the free edges together.

4. Apparatus for manufacturing stuffed alimentary pastes comprising in combination, feeding means for a sheet of paste, a hopper for containing stuffing material, means for imparting motion to the hopper, feeding means for the stuffing material, means for cutting and indenting sections of the paste, said means being integral with the hopper and moving therewith and means for folding and closing the stuffed pastes comprising partially indented cylinders, and means for imparting an intermittent rotary motion to said cylinders.

5. Apparatus for manufacturing stuffed alimentary pastes comprising in combination, feeding means for a sheet of paste, a hopper for containing stuffing material, means for imparting motion to the hopper, feeding means for the stuffing material, means for detaching the stuffing material from the walls of the hopper receptacle thereof, means for cutting and indenting sections of the paste, said means being integral with the hopper and moving therewith, means for folding and closing the stuffed pastes comprising partially indented cylinders, and means for imparting an intermittent rotary motion to said cylinders.

In testimony whereof I affix my signature in presence of two witnesses.

VITALIANO TOMMASINI.

Witnesses:
    B. CARTO SALVOLIE,
    GIULIO MANZINI.